(12) United States Patent
Salmon et al.

(10) Patent No.: US 12,326,365 B2
(45) Date of Patent: Jun. 10, 2025

(54) TWO-DIMENSIONAL TERAHERTZ RADIATION DETECTOR

(71) Applicant: OFFICE NATIONAL D'ETUDES ET DE RECHERCHES AÉROSPATIALES, Palaiseau (FR)

(72) Inventors: Arthur Salmon, Palaiseau (FR); Patrick Bouchon, Verrieres le Buisson (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 389 days.

(21) Appl. No.: 17/920,492

(22) PCT Filed: Apr. 16, 2021

(86) PCT No.: PCT/FR2021/050675
§ 371 (c)(1),
(2) Date: Oct. 21, 2022

(87) PCT Pub. No.: WO2021/214404
PCT Pub. Date: Oct. 28, 2021

(65) Prior Publication Data
US 2023/0143274 A1    May 11, 2023

(30) Foreign Application Priority Data

Apr. 21, 2020    (FR) ...................................... 2003967

(51) Int. Cl.
*H04N 23/12*    (2023.01)
*G01J 3/02*    (2006.01)
(Continued)

(52) U.S. Cl.
CPC ............. *G01J 3/108* (2013.01); *G01J 3/0208* (2013.01); *H04N 23/12* (2023.01); *H04N 23/23* (2023.01);
(Continued)

(58) Field of Classification Search
CPC ..................................................... H04N 23/12
See application file for complete search history.

(56) References Cited

U.S. PATENT DOCUMENTS 5,436,453 A * 7/1995 Chang ...................... H01Q 5/42
250/370.06
2005/0122269 A1    6/2005 Frazier
(Continued)

FOREIGN PATENT DOCUMENTS

EP    3 413 127    12/2018
FR    2 944 141    10/2010

OTHER PUBLICATIONS

International Search Report for PCT/FR2021/050675 dated Jul. 21, 2021, 6 pages.
(Continued)

*Primary Examiner* — David P Porta
*Assistant Examiner* — Shun Lee
(74) *Attorney, Agent, or Firm* — Maier & Maier, PLLC (57) ABSTRACT

A two-dimensional terahertz radiation detector includes a spectral conversion element, an array of microlenses, and a matrix image sensor. Such a detector can be particularly compact, light, and inexpensive. For some embodiments, it can be used to produce multispectral images of an external scene, from terahertz radiation that originates from the scene.

20 Claims, 2 Drawing Sheets

(51) Int. Cl.
*G01J 3/10* (2006.01)
*H04N 23/23* (2023.01)
*G01J 3/28* (2006.01)
*G01J 5/00* (2022.01)

(52) U.S. Cl.
CPC .................. *G01J 2003/2813* (2013.01); *G01J 2005/0077* (2013.01)

(56) References Cited

U.S. PATENT DOCUMENTS

| | | |
|---|---|---|
| 2011/0284981 A1 | 11/2011 | Chang et al. |
| 2014/0294043 A1 | 10/2014 | Samarao et al. |

OTHER PUBLICATIONS

Written Opinion of the ISA for PCT/FR2021/050675 dated Jul. 21, 2021, 12 pages.

\* cited by examiner

TWO-DIMENSIONAL TERAHERTZ RADIATION DETECTOR

This application is the U.S. national phase of International Application No. PCT/FR2021/050675 filed Apr. 16, 2021 which designated the U.S. and claims priority to FR 2003967 filed Apr. 21, 2020, the entire contents of each of which are hereby incorporated by reference.

TECHNICAL FIELD

This description concerns a two-dimensional terahertz radiation detector.

PRIOR ART

In this description, terahertz radiation refers to electromagnetic radiation whose wavelength is between 30 μm (micrometers) and 3 mm (millimeters), corresponding to a frequency which is between 0.1 THz (terahertz), which is 100 GHz (gigahertz), and 10 THz.

Infrared radiation refers to electromagnetic radiation for which the wavelength is between 1 μm and 30 μm, corresponding to a frequency between 10 THz and 300 THz.

Infrared imaging is widely used for many applications. It is based on detection of images formed from infrared radiation, referred to as infrared images. As a result, infrared cameras are currently available at reduced cost, in particular cameras that operate in wavelength spectral ranges of between 3 μm and 5 μm, or between 8 μm and 12 μm.

Numerous applications have been identified for imaging systems efficient for capturing images formed by terahertz radiation, i.e. in which the image information corresponds to sources, reflectors, or scatterers of terahertz radiation that are present within a field of observation. However, the development of image sensors sensitive to terahertz radiation requires significant investment, so that such sensors are not currently available at prices that would be compatible with the contemplated applications.

It is known, in particular from document EP 3 413 127 A1, to use a spectral conversion element for electromagnetic radiation, to convert terahertz radiation received by this element into infrared radiation that is detected by an infrared camera. A two-dimensional terahertz radiation detector can then be produced, which comprises the following components:

the spectral conversion element for electromagnetic radiation, comprising a two-dimensional support, antennas referred to as terahertz antennas, which are carried by the two-dimensional support and adapted for having an absorption peak for the electromagnetic radiation when a wavelength of this electromagnetic radiation is between 30 μm and 3 mm, corresponding to terahertz radiation, and further comprising infrared emitters which are also carried by the two-dimensional support, those of the infrared emitters which are aligned with one of the terahertz antennas, parallel to a direction perpendicular to the two-dimensional support, being thermally coupled with this terahertz antenna so that absorption of terahertz radiation by each terahertz antenna causes, by each infrared emitter coupled with the terahertz antenna, an emission of infrared radiation having a wavelength which is comprised between 1 μm and 30 μm;

an image sensor, of the matrix type and having a surface, referred to as the photosensitive surface, which is sensitive to the infrared radiation; and an imaging system, efficient for the infrared radiation and adapted for optical conjugation of the infrared emitters with the photosensitive surface of the image sensor.

However, in order to be efficient for infrared radiation, the imaging systems that have been used so far in such detectors are bulky and expensive. The two-dimensional terahertz radiation detectors that incorporate these imaging systems therefore have the same drawbacks, and for this reason their applications are limited.

Technical Problem

In light of this situation, one object of the present invention is to propose a new two-dimensional terahertz radiation detector which does not have these drawbacks.

SUMMARY OF THE INVENTION

To achieve this or another object, the invention proposes a two-dimensional terahertz radiation detector which comprises, as previously, the spectral conversion element, the matrix-type image sensor which is sensitive to infrared radiation, and the imaging system which is efficient for the infrared radiation, but in which the imaging system comprises an array of converging microlenses. The converging microlenses are placed next to each other parallel to the two-dimensional support of the spectral conversion element and to the photosensitive surface of the image sensor, the array of microlenses being located between the spectral conversion element and the image sensor, facing the infrared emitters. In addition, the array of converging microlenses is such that only one of the microlenses is dedicated to each terahertz antenna, separately from the other terahertz antennas, so as to form, in an area of the photosensitive surface of the image sensor, an image of each infrared emitter that is coupled to this terahertz antenna. In addition, areas in the photosensitive surface of the image sensor which correspond to separate terahertz antennas are disjoint. Alternatively, the array of converging microlenses may be such that a single microlens is dedicated to a group of adjacent terahertz antennas, separately from other groups of adjacent terahertz antennas, so as to form, in an area of the photosensitive surface of the image sensor, an image of each infrared emitter that is coupled to this group of adjacent terahertz antennas. In this other configuration of the detector, the areas in the photosensitive surface of the image sensor which correspond to separate groups of adjacent terahertz antennas are also disjoint.

Thanks to using the array of microlenses, the detector can be compact, with a limited thickness perpendicular to the two-dimensional support of the spectral conversion element. In addition, the detector of the invention can have a weight which is also reduced. Finally, it can be inexpensive, since the arrays of microlenses can be fabricated at low cost using inexpensive materials. For these reasons, terahertz radiation detectors in accordance with the invention can advantageously be used for many applications.

The detector of the invention is further suitable for simultaneously providing measurements of parts of the terahertz radiation that are impinging separately onto separate areas of the spectral conversion element, each provided with at least one terahertz antenna.

According to one optional improvement of the invention, some of the infrared emitters of the spectral conversion element, forming a subset, are not aligned with any of the terahertz antennas along the direction perpendicular to the two-dimensional support, and each infrared emitter of this subset is imaged by one of the microlenses on the photosensitive surface of the image sensor. Thus, the image sensor captures, at a location in its photosensitive surface which corresponds to the image of one of the infrared emitters of the subset, a signal which is representative of an average temperature of the spectral conversion element. This signal can be useful in determining a background level for the detection signals delivered by the image sensor and which correspond in part, via the spectral conversion element and the array of microlenses, to the reception of terahertz radiation. This background level can then be subtracted from the detection signals delivered by the image sensor, in order to obtain measurement results that only concern the intensity of the terahertz radiation.

Furthermore, in preferred embodiments of the detector, the two-dimensional support may be transparent to the terahertz radiation, and each terahertz antenna may comprise two portions of metal layers which are located one on each of two opposite faces of the two-dimensional support, being aligned along the direction perpendicular to the two-dimensional support. In this manner, the two portions of metal layers form a Fabry-Pérot resonator which is efficient for the terahertz radiation, and which constitutes the terahertz antenna. In this case, for each terahertz antenna formed in this manner, the one of the two portions of metal layers which is carried by the face of the two-dimensional support which is facing the array of microlenses, may have a recess in which is located each infrared emitter that is coupled to the terahertz antenna. Such embodiments are particularly easy to manufacture, and provide improved accuracy for measurements of the intensity of terahertz radiation which is incident on each terahertz antenna.

It is possible that a material of the two-dimensional support may be electrically insulating and have a capacity to thermally emit infrared radiation, also called emissivity value, which is preferably greater than 0.5. Then, each infrared emitter of the spectral conversion element may be composed of an area of the face of the two-dimensional support which is facing the array of microlenses, and where the material of the two-dimensional support is exposed.

Alternatively, each infrared emitter of the spectral conversion element may be composed of a portion of a material which has a capacity to thermally emit infrared radiation, again preferably greater than 0.5, this portion of material being located on the face of the two-dimensional support which is facing the array of microlenses, and being exposed. The material of the portion which emits infrared radiation may be, for example, composed of carbon nanotubes (C).

Furthermore, and in general for the invention, at least one of the following additional features may optionally be reproduced, alone or in combination of several of them together:
the spectral conversion element, the array of microlenses and the image sensor may be arranged parallel to one another within a layered stack, this stack possibly further comprising one or more solid spacers that are transparent to infrared radiation, suitable for defining intermediate distances between the spectral conversion element and the array of microlenses, and/or between the array of microlenses and the image sensor;
each microlens may be silicone-based, or based on a material which has a refractive index gradient which is effective for infrared radiation;
each microlens may have a focal length value which is less than 2 mm;
each terahertz antenna may have first lateral dimensions, parallel to the two-dimensional support, which are between 15 μm and 4 mm. In this case, each infrared emitter may have second dimensions, also parallel to the two-dimensional support, which are between 15 μm and 0.1 mm, and a matrix pitch of the image sensor in the photosensitive surface may be less than 50 μm;
at least some of the terahertz antennas may have an anisotropic shape in a plane parallel to the two-dimensional support, so that they have absorption efficiencies which are different for two perpendicular directions of linear polarization of the terahertz radiation;
the two-dimensional support may be a film based on at least one polymer, in particular a film based on polyimide, for example as known under the trade name Kapton®, based on polyethylene terephthalate, known by the acronym PET, based on polytetrafluoroethylene, known by the acronym PTFE or the trade name Teflon®, or based on polypropylene, known by the acronym PP;
each terahertz antenna may comprise at least one metal portion which is based on silver (Ag), gold (Au), platinum (Pt), palladium (Pd), iridium (Ir), aluminum (Al), copper (Cu), titanium (Ti), titanium nitride (TiN), tungsten (W), or chromium (Cr), or which is based on an alloy comprising silver, gold, platinum, palladium, iridium, aluminum, copper, titanium, titanium nitride, tungsten, or chromium;
the terahertz antennas may be alternated on the two-dimensional support according to central wavelength values of the absorption peak of the terahertz radiation, so that the image sensor captures, at each readout cycle of this image sensor, a multispectral image composed of several elementary images which each correspond to one of the central wavelength values of the absorption peak of the terahertz radiation, and which are interlaced in the photosensitive surface; and
the detector may further comprise an objective which is effective for the terahertz radiation, and which is arranged to form, on the spectral conversion element, an image of a scene external to the detector. The image sensor can thus capture an image of the scene that is associated with the terahertz radiation. The objective used is composed of metal mirrors, and may for example be an objective of Cassegrain-type. For such application of terahertz radiation imaging, the detector may advantageously further comprise a terahertz radiation illumination system, which is arranged to send terahertz radiation towards the scene.

When the detector is associated with such objective for a terahertz imaging function, and the two-dimensional support 1 is transparent to infrared radiation, and some of the microlenses are not associated with any of the terahertz antennas or with any of the infrared emitters, then the image sensor can capture, at the locations of its photosensitive surface which are facing these microlenses, an infrared image of the scene external to the detector. Such capture of infrared image of the scene is then simultaneous with the capture of terahertz image, or of several terahertz images in the multispectral case.

BRIEF DESCRIPTION OF THE FIGURES

The features and advantages of the invention will become more clearly apparent from the following detailed description of some non-limiting embodiments, with reference to the appended figures, which include.

DETAILED DESCRIPTION OF THE INVENTION

For clarity sake, the dimensions of the elements represented in these figures correspond neither to actual dimensions nor to actual dimension ratios. Furthermore, identical references indicated in different figures designate elements which are identical or have identical functions.

Figure 1:
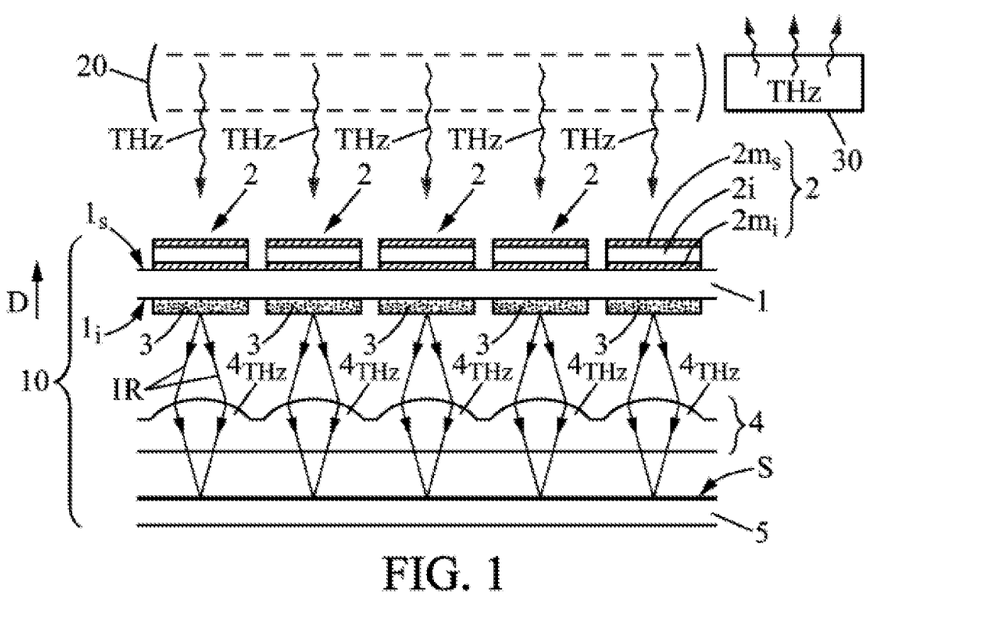
FIG. 1 is a cross-section of a detector according to the invention, in a first embodiment.

In FIG. 1, reference number 10 generally designates the terahertz radiation detector. It comprises a two-dimensional support which may be of an insulating material, such as a polyimide-based film 1 commonly referred to as Kapton® film. Its thickness may be about 25 μm.

Reference numbers 2 designate terahertz antennas which are arranged on an upper face $1_s$ of the film 1, facing towards the outside of the detector 10. Thus, the terahertz antennas 2 can receive terahertz radiation, denoted THz, which originates from the outside, for example from a scene located in front of the detector 10. Each terahertz antenna 2 is designed to have an absorption peak within the spectral domain of terahertz radiation, meaning it has an absorption peak for a wavelength value of THz radiation which is between 30 μm and 3 mm. Many possible implementations for the terahertz antennas 2 are known to those skilled in the art, in particular those cited in publication EP 3 413 127 A1. As an example, each terahertz antenna 2 may be formed by a Fabry-Pérot structure, comprising an upper metal layer portion $2m_s$, an intermediate insulating layer portion $2i$, and a lower metal layer portion $2m_i$, which are superimposed on the upper face $1_s$ of the film 1. For example, the metal layer portions $2m_s$ and $2m_i$ may made of silver, with respective thicknesses of about 20 nm, and the intermediate insulating layer portion $2i$ may be made of silica ($SiO_2$), with a thickness of several micrometers. Conventional portions of additional layers, providing an adhesion function and commonly referred to as bonding layers, may be used although they are not represented. In a known manner, the central wavelength of the radiation absorption peak of the terahertz antennas 2 can be defined by the lateral dimensions of the metal layer portions $2m_s$ and $2m_i$, measured parallel to the film 1. These lateral dimensions may be between 15 μm and 4 mm, in particular.

Reference numbers 3 designate infrared emitters, which are arranged on the lower face 1 of the film 1. Each infrared emitter 3 is located in line with one of the terahertz antennas 2, in a direction perpendicular to the film 1, denoted D. It may be composed of a portion of a material which has a sufficient capacity to emit heat as infrared radiation. Such a capacity to emit infrared radiation is usually characterized by an emissivity value, denoted ε. Preferably, the emissivity of the material of the infrared emitters 3 is greater than 0.5. For example, the material of the infrared emitters 3 may be based on carbon nanotubes, with a thickness of approximately 1 μm along direction D, and lateral dimensions comprised between 15 μm and 0.1 mm, parallel to the film 1. Such portions of material based on carbon nanotubes for forming the infrared emitters 3 may be deposited by an available printer technology. Each terahertz antenna 2 which is thermally coupled to one of the infrared emitters 3 in a one-to-one relationship in this first embodiment of the invention, together with it forms a spectral converter for electromagnetic radiation. The coupling of the terahertz antenna 2 with the corresponding infrared emitter 3 results from the thermal diffusion which occurs between them. In such a spectral converter, the energy of the terahertz radiation which is absorbed by each antenna 2 is converted into heat, and this heat is transferred through the film 1 to the corresponding infrared emitter 3, which emits infrared radiation at an intensity which depends on that of the absorbed terahertz radiation. The infrared radiation which is thus emitted by each emitter 3 is contained at least in part within the spectral range of wavelengths between 1 μm and 30 μm. In order to form spectral converters which are separate and quasi-independent inside the spectral conversion element, the terahertz antennas 2, with the infrared emitters 3 respectively associated with them, are apart from each other parallel to the film 1 so that there is negligible residual thermal coupling between one of the terahertz antennas 2 and one of the infrared emitters 3 associated with another of the terahertz antennas 2. In other words, crosstalk of the spectral conversion element is not intrusive.

In variant embodiments of the spectral conversion element, the following modifications to the first embodiment of FIG. 1 may be adopted:

the metal layer portions $2m_i$ may be respective portions of a continuous metal layer, provided that this continuous layer does not cause thermal bridges between adjacent terahertz antennas, which would generate crosstalk to an intrusive extent;

the portions of material which constitute the infrared emitters 3 may be respective portions of another continuous layer, provided that this other continuous layer does not cause thermal bridges between adjacent emitters, which would generate crosstalk to an intrusive extent;

each terahertz antenna 2 may have an alternative composition, for example composed of an electromagnetic Helmholtz resonator, or of a MIM (for metal-insulator-metal) antenna, for example formed by a metal rod located above a metal layer, etc., instead of a Fabry-Pérot structure as shown in FIG. 1. Optionally, each terahertz antenna 2 may also be composed of several Fabry-Pérot structures which are coupled together, so as to provide an absorption coupling resonance with a quality factor value which is greater than 50;

each infrared emitter 3 may be composed of a portion of a thermally emissive material other than a material based on carbon nanotubes. For example, this alternative material may be based on silica, or based on a polymer such as polyimide, polyethylene terephthalate, polytetrafluoroethylene, or polypropylene; and each infrared emitter 3 may also have an alternative composition, for example also being composed of an electromagnetic Helmholtz resonator, or a MIM antenna, etc., instead of a portion of thermally emissive material as shown in FIG. 1. In another possibility, each infrared emitter 3 may be formed by a portion of the lower face 1 of the film 1, when this face is exposed and the material of the film 1 has an emissivity value which is sufficient, for example greater than 0.5.

According to the invention, the detector 10 is implemented by combining the spectral conversion element with an array of microlenses 4 and with an image sensor 5 which is sensitive in the infrared range, i.e. for wavelength values of electromagnetic radiation that are between 1 μm and 30 μm. The array of microlenses 4 and a photosensitive surface S of the image sensor 5 are parallel to the spectral conversion element, so as to form a stack in direction D. Optionally, appropriate spacers (not shown) fix the separation distances between the spectral conversion element and the array of microlenses 4 on the one hand, and/or between the array and the image sensor 5 on the other hand. For their shapes, their material, and their positions, such spacers are selected so as not to interfere with the propagation of infrared radiation emitted by the emitters 3 in the direction of the image sensor 5. Such stack may have a low total thickness, enabling the detector 10 to be compact. Optionally, a protective shielding window made of a material transparent to terahertz radiation may also be arranged above face $1_s$ of the film 1, in front of the terahertz antennas 2, to protect them against dirt, corrosion, or external mechanical attacks. Finally, the stack may advantageously be maintained at a reduced pressure, to reduce gaseous diffusions or gaseous convections likely to produce crosstalk due to parasitic heat transfers.

Figure 4:
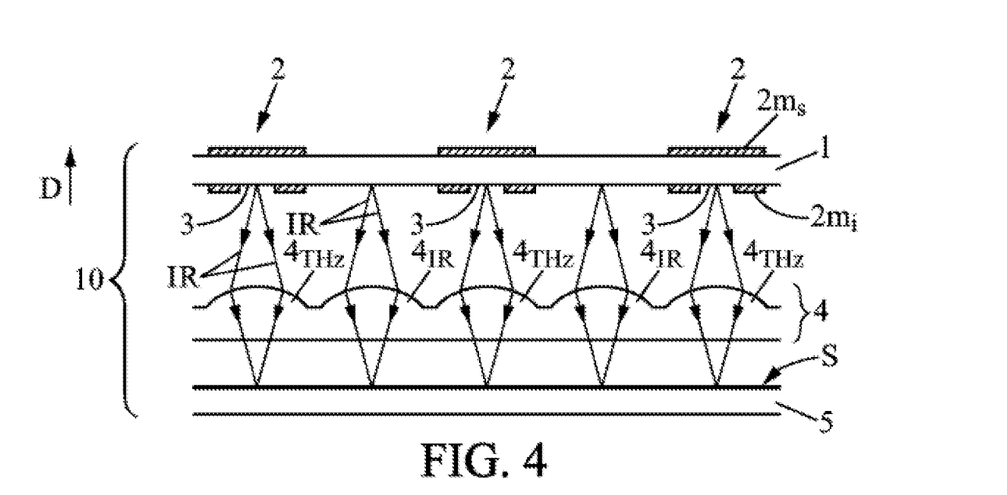
FIG. 4 is a cross-section of yet another detector according to the invention, in a fourth embodiment.

In the context of the invention, "array of microlenses" is understood to mean a single optical component, which is integral, made of a transparent material that is refractive to infrared radiation, and which has a shape pattern repeated along two perpendicular directions, this pattern forming a converging lens. For example, the array of microlenses 4 may be made of silicone. Each microlens may be composed of a convex part of at least one of the faces of the array 4, or by an appropriate structure with refractive index gradient in the material of the array 4 at the location of this microlens. For the first embodiment of the invention as shown in FIG. 1, the repetition pitch of the microlens pattern is equal to that of the terahertz antennas 2 in the spectral conversion element. This pitch may be equal to 1.5 mm if the largest lateral dimension of each terahertz antenna 2 is 0.8 mm, for example. In other embodiments of the invention, the spatial frequency of the microlenses in their two directions of repetition may be a multiple of the spatial frequency of the terahertz antennas. In such a case, for example as shown in FIG. 4, some of the microlenses are not directly useful for detecting terahertz radiation.

The array of microlenses 4 is sized so that a single microlens is in line along direction D with each of the terahertz antennas 2. This microlens is designated by the reference $4_{THz}$. It collects the infrared radiation emitted by the emitter 3 associated with the terahertz antenna 2, and transmits it to the image sensor 5. In addition, the distance between the spectral conversion element and the array of microlenses 4, and the distance between the array of microlenses 4 and the image sensor 5, are adapted so that each microlens optically conjugates, for infrared radiation, the surface of the corresponding emitter 3 with the photosensitive surface S of the image sensor 5. Each microlens may have a focal length which is equal to 1 mm, for example. In addition, the image sensor 5 is selected so that at least one photosensitive element in its surface S, for example a dozen photosensitive elements, is located within the image of each infrared emitter 3 which is formed by the corresponding microlens $4_{THz}$. In the figures, IR designates the infrared radiation which is concentrated by each microlens on the photosensitive surface S of the image sensor 5. It follows from the above description of the spectral conversion element that the areas of the photosensitive surface S of the sensor image 5 which are associated with adjacent terahertz antennas 2 are disjoint. In this manner, the detector 10 is composed of several terahertz radiation detection channels which are arranged in parallel, which are independent of each other and have little residual crosstalk, and which operate simultaneously according to the read sequences of the image sensor 5. For example, 60×40 detection channels can thus be arranged in parallel, in a matrix arrangement parallel to the film 1. Typically, the pitch spacing of the photosensitive elements in the surface S of the image sensor 5 may be between 15 μm and 50 μm, for example equal to 30 μm, and some of these photosensitive elements may be unused when they are located between images of adjacent infrared emitters 3.

Figure 2:
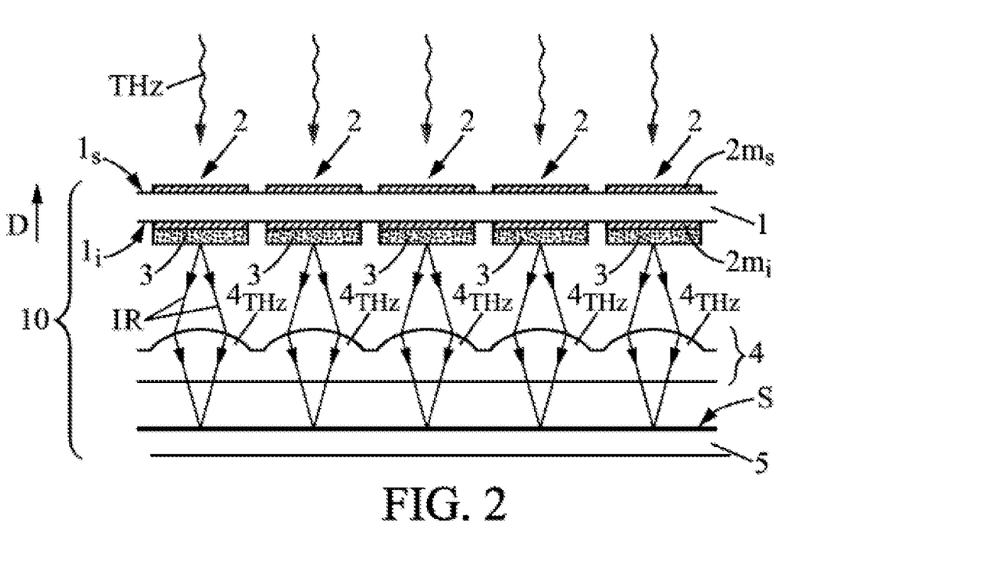
FIG. 2 is a cross-section of another detector according to the invention, in a second embodiment.

FIG. 2 shows an alternative embodiment, which may be simpler to manufacture than that of FIG. 1. The two metal layer portions $2m_s$ and $2m_i$ used to form the Fabry-Pérot resonator of each terahertz antenna 2 may be located one on each of the opposing faces $1_s$ and $1_i$ of the film 1, when said film is made of material transparent to terahertz radiation. The film 1 may also be composed of a Kapton® film about 25 μm thick. The metal layer portions $2m_s$ and $2m_i$ may then be made of aluminum or silver, and be deposited using printing or lithography technology. In this case, the film 1 constitutes the intermediate insulating medium of the Fabry-Pérot structures. The portions of thermally emissive material which form the infrared emitters 3 can be deposited over the metal layer portions $2m_i$, on face 1 of the film 1, and also be based on carbon nanotubes. The operation of the detector 10 for such a second embodiment of the invention is identical to the one described with reference to FIG. 1.

Figure 3:
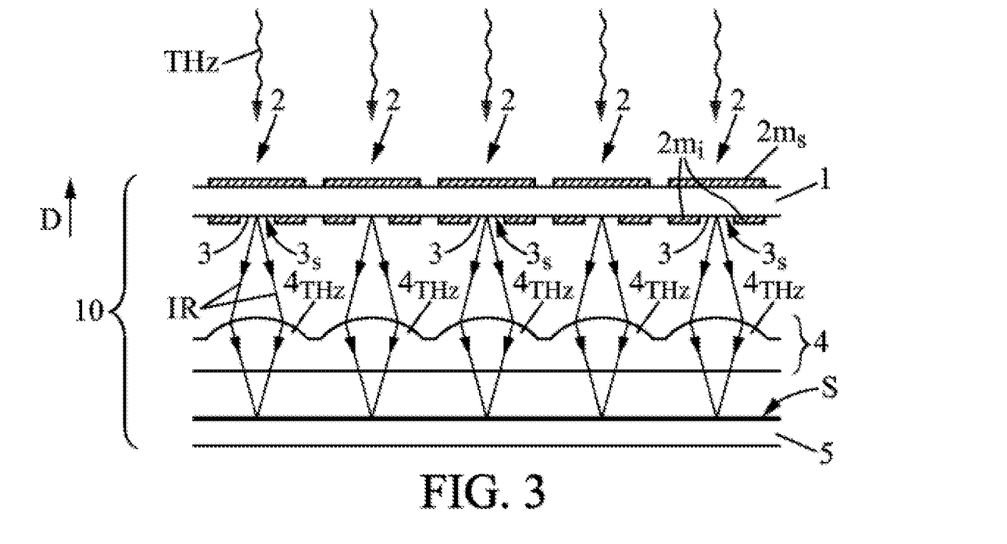
FIG. 3 is a cross-section of yet another detector according to the invention, in a third embodiment.

FIG. 3 shows a third embodiment which is even simpler, based on the embodiment of FIG. 2, in which each metal layer portion $2m_i$ has a recess in a central part thereof. This recess has dimensions chosen so as not to interfere significantly with the operation of the terahertz antenna 2 concerning its effectiveness in absorbing terahertz radiation. Thus, a portion $3s$ of face 1 of the film 1 is exposed within each terahertz antenna 2. This constitutes the infrared emitter 3 which is coupled to this terahertz antenna 2 when the material of the film 1 has a sufficiently high emissivity value, for example greater than 0.5. Alternatively, a portion of thermally emissive material, for example again based on carbon nanotubes, may be deposited in each recess to form the infrared emitters 3. The exposed metal layer portions $2m_i$ do not alter the measurements of the infrared radiation IR which are carried out by those of the photosensitive elements of the image sensor 5 which are optically conjugate with the recesses, because these metal layer portions $2m_i$ have a low or very low emissivity value.

FIG. 4 shows an improvement of the invention, which makes it possible to obtain an evaluation of the background level of infrared radiation of thermal origin, which is superimposed on the radiation IR caused by absorption of terahertz radiation. For this purpose, some of the microlenses of the array 4 are not associated with any terahertz antenna 2, by an alignment parallel to direction D. The microlenses of the array 4 are thus divided into two categories: those in which photosensitive elements of the image sensor 5 are optically conjugate with an infrared emitter 3 which is thermally coupled with a terahertz antenna 2, and those in which photosensitive elements of the image sensor 5 are optically conjugate with an infrared emitter which is not thermally coupled with any terahertz antenna. The former are once again designated by the reference $4_{THz}$ in FIG. 4, and participate in the operation of detecting terahertz radiation as described above. The latter are designated by the reference $4_{IR}$. The infrared radiation which is concentrated on the image sensor 5 by the $4_{IR}$ microlenses comes from thermal emission which is not generated by the absorption of terahertz radiation. It is therefore background thermal emission which has no relation to the terahertz radiation to be detected. The photosensitive elements of the image sensor 5 which are facing the $4_{IR}$ lenses provide measurements of this background infrared thermal emission, so that the level of this background thermal emission can be deducted from the intensities measured by those of the photosensitive elements of the image sensor 5 which are facing the $4_{THz}$ lenses. The detector 10 can thus provide terahertz radiation measurement results which are more precise and exact. In the embodiment of FIG. 4, the material of the film 1 is assumed to have a thermal emissivity value which is sufficiently high. It is then opaque to infrared radiation which could originate from the outside, concurrently with the terahertz radiation.

A variant of the improvement of FIG. 4 is obtained by using a material for the film 1 which is transparent to infrared radiation, in addition to being transparent to terahertz radiation, for example such as silicone film. Then, if the film 1 thus formed has no infrared emitter 3 facing the $4_{IR}$ microlenses, those of the photosensitive elements of the image sensor 5 which are in line with these $4_{IR}$ microlenses provide measurements of the intensity of incident infrared radiation that originate externally, on face $1_s$ of the film 1.

To obtain a terahertz radiation imaging function using one of the detectors 10 just described, the detector must be combined with an objective 20 (see FIG. 1) which is arranged to form an image of a scene external to the detector 10 on the upper face $1_s$ of the film 1. Such an objective 20 preferably is composed only of metal reflecting surfaces, in order to be devoid of any chromatic effect. For example, a Cassegrain type of telescope may be used as the objective 20. For such a terahertz imaging application, each area of the photosensitive surface S of the image sensor 5 which is conjugate with an infrared emitter 3 thermally coupled with one of the terahertz antennas 2, constitutes a basic point in image detection commonly referred to as a pixel. The detector-imager which is thus formed, effective for terahertz radiation, may be associated with a terahertz radiation source 30, which is controlled to illuminate the scene with terahertz radiation when an image acquisition sequence is in progress. The terahertz image that is then captured has improved contrast. Such terahertz radiation sources are known to those skilled in the art, so it is not necessary to cite them here.

An improvement to such a terahertz imaging function can provide multispectral images. To do this, the terahertz 2 antennas are of several types, for example from two to nine types, antennas of a same type being identical and therefore having the same spectral position of the absorption peak, but which is different from the spectral position of the absorption peak of the antennas of the other types. The different types of terahertz antennas are differentiated in particular by the lateral dimensions of the metal layer portions $2m_s$ and $2m_i$. Preferably, the terahertz antennas 2 of all the types can be distributed on the film 1 in an equivalent manner between types of antennas, for example in a pattern which is regularly repeated in two perpendicular directions. Then, in each read cycle of the image sensor 5, several elementary images of the scene are captured simultaneously, which respectively correspond to the central wavelength values of the absorption peaks of the different types of terahertz antennas. These elementary images of the scene, corresponding to different respective spectral sensitivities, are interlaced in the photosensitive surface S of the image sensor 5 in accordance with the repeating pattern of the different types of terahertz antennas 2 on the film 1. Greater information can thus be collected to characterize the scene located within the optical input field of the detector 10 equipped with the objective 20. For such a multispectral terahertz imaging function, it may be advantageous for all the infrared emitters 3 which are used, regardless of the type of terahertz antenna 2 with which each infrared emitter 3 is coupled, to have individual infrared radiation emission efficiencies which are identical. For example, the infrared emitters 3 may have dimensions which are adapted according to the type of terahertz antenna, so that all the terahertz image detection points of the detector 10 have identical or similar sensitivities. Optionally, a calibration of these sensitivities of the detector 10 can be carried out, separately by type of terahertz antennas 2. In simplified embodiments, all the infrared emitters 3 may have identical dimensions, regardless of the type of terahertz antenna 2 with which each of them is coupled.

When the objective 20 is used in combination with the detector 10 of FIG. 4, and when the film 1 is transparent to infrared radiation which originates from the scene, the image sensor 5 also delivers an infrared image of the scene, via those of its photosensitive elements which are facing the $4_{IR}$ microlenses.

Another improvement, which may or may not be combined with the imaging function, makes it possible to collect information on the polarization of the terahertz radiation THz. In a known manner, each terahertz antenna 2 can have an absorption capacity which is different between two linear polarizations of the terahertz radiation, if it has an appropriate shape in a plane parallel to the film 1. For example, a first subset of the terahertz antennas 2 may have rectangular shapes that are elongated along a first direction, and a second subset of the terahertz antennas 2 may have rectangular shapes that are elongated along a second direction that is perpendicular to the first. Then, the two subsets of Terahertz antennas 2 provide, in combination with the infrared emitters 3, the $4_{THz}$ microlenses, and the image sensor 5, two sets of terahertz radiation intensity measurements which separately correspond to the linear polarizations for this terahertz radiation, which are parallel to the first and second directions. It is possible to have terahertz antennas 2 of a third subset which can have square or round shapes parallel to the film 1, so that their absorption capacity for terahertz radiation does not depend on the polarization of this radiation. When such an improvement in differentiating according to polarization is combined with the use of the objective 20, separate images of the scene are obtained for each of the two directions of linear polarization, and possibly an additional image which is independent of polarization, in each read cycle of the image sensor 5.

It is understood that the invention may be reproduced by modifying secondary aspects of the embodiments which have been described in detail above, while retaining at least some of the cited advantages. In particular, it is not essential for the photosensitive surface S of the image sensor 5 to be located within a plane exactly conjugate with the exposed surface of the infrared emitters 3. In addition, depending on the wavelength of the terahertz radiation absorbed by each antenna 2, it is possible to associate several terahertz antennas which are adjacent on the two-dimensional support 1, with a same $4_{THz}$ microlens. Such arrangements with several terahertz antennas for each $4_{THz}$ microlens may be preferable depending on the central wavelength of the absorption peak of the terahertz antennas, in order to obtain sufficient detection sensitivity. Finally, all numerical values that have been cited are for illustrative purposes only, and may be changed according to the application considered.

The invention claimed is:

1. A two-dimensional terahertz radiation detector, comprising:
   a spectral conversion element for electromagnetic radiation, comprising a two-dimensional support, antennas referred to as terahertz antennas, which are carried by the two-dimensional support and adapted for having an absorption peak for the electromagnetic radiation when a wavelength of said electromagnetic radiation is between 30 μm and 3 mm, corresponding to what is referred to as terahertz radiation, and further comprising infrared emitters which are also carried by the two-dimensional support, those of said infrared emitters which are aligned with one of the terahertz antennas, parallel to a direction perpendicular to the two-dimensional support, being thermally coupled with said terahertz antenna so that absorption of terahertz radiation by each terahertz a causes, by each infrared emitter coupled with said terahertz antenna, an emission of infrared electromagnetic radiation having a wavelength which is comprised between 1 μm and 30 μm, referred to as infrared radiation;

an image sensor, of the matrix type and having a surface, referred to as a photosensitive surface, which is sensitive to the infrared radiation; and an imaging system, efficient for the infrared radiation and adapted for optical conjugation of the infrared emitters with the photosensitive surface of the image sensor, wherein the imaging system comprises an array of converging microlenses which are placed next to each other parallel to the two-dimensional support of the spectral conversion element and to the photosensitive surface of the image sensor, said array of microlenses being located between the spectral conversion element and the image sensor, facing the infrared emitters, and being such that only one of the microlenses is dedicated to each terahertz antenna, separately from the other terahertz antennas, so as to form, in an area of the photosensitive surface of the image sensor, an image of each infrared emitter that is coupled to said terahertz antenna, or else such that a single one of the microlenses is dedicated to a group of adjacent terahertz antennas, separately from other groups of adjacent terahertz antennas, so as to form, in an area of the photosensitive surface of the image sensor, an image of each infrared emitter that is coupled to said group of adjacent terahertz antennas, the areas in the photosensitive surface of the image sensor which correspond to separate terahertz antennas, or to separate groups of adjacent terahertz antennas, being disjoint, and wherein some of the infrared emitters of the spectral conversion element, forming a subset, are not aligned with any of the terahertz antennas along the direction perpendicular to the two-dimensional support, and each infrared emitter of said subset is imaged by one of the microlenses on the photosensitive surface of the image sensor, so that said image sensor captures, at a location in said photosensitive surface which corresponds to the image of an infrared emitter of said subset, a signal representative of an average temperature of the spectral conversion element.

2. The detector according to claim 1, wherein the two-dimensional support is transparent to the terahertz radiation, and each terahertz antenna comprises two portions of metal layers which are located one on each of two opposite faces of the two-dimensional support, being aligned along the direction perpendicular to said two-dimensional support so that said two portions of metal layers form a Fabry-Perot resonator which is efficient for the terahertz radiation, said resonator constituting the terahertz antenna, and, for each terahertz antenna thus formed, the one of the two portions of metal layers which is carried by the face of the two-dimensional support which is facing the array of microlenses, has a recess in which is located each infrared emitter that is coupled to said terahertz antenna.

3. The detector according to claim 1, wherein a material of the two-dimensional support is electrically insulating and has a capacity to thermally emit infrared radiation, and each infrared emitter of the spectral conversion element is composed of an area of a face of said two-dimensional support which is facing the array of microlenses, and the material of the two-dimensional support is exposed in said area.

4. The detector according to claim 1, wherein each infrared emitter of the spectral conversion element is formed by a portion of a material which has a capacity to thermally emit infrared radiation, said portion of material being located on a face of the two-dimensional support which is facing the array of microlenses, and being exposed.

5. The detector according to claim 1, wherein spectral conversion element, the array of microlenses and the image sensor are arranged parallel to each other within a layered stack.

6. The detector according to claim 1, wherein each microlens is silicone-based, or based on a material which has a refractive index gradient which is effective for the infrared radiation.

7. The detector according to claim 1, wherein each microlens has a focal length value which is less than 2 mm.

8. The detector according to claim 1, wherein each terahertz antenna has first lateral dimensions, parallel to the two-dimensional support, which are between 15 μm and 4 mm, and each infrared emitter has second dimensions, also parallel to the two-dimensional support, which are between 15 μm and 0.1 mm, and a matrix pitch of the image sensor in the photosensitive surface is less than 50 μm.

9. The detector according to claim 1, wherein at least some of the terahertz antennas have an anisotropic shape in a plane parallel to the two-dimensional support, so that said terahertz antennas of anisotropic shape have absorption efficiencies which are different for two perpendicular directions of linear polarization of the terahertz radiation.

10. The detector according to claim 1, wherein the two-dimensional support is a film based on at least one polymer, and each terahertz antenna comprises at least one metal portion which is based on silver, gold, platinum, palladium, iridium, aluminum, copper, titanium, titanium nitride, chromium, or which is based on an alloy tungsten, or comprising silver, gold, platinum, palladium, iridium, aluminum, copper, titanium, nitride titanium, tungsten, or chromium.

11. The detector according to claim 1, wherein the terahertz antennas are alternated on the two-dimensional support according to central wavelength values of the absorption peak of the terahertz radiation, so that the image sensor captures, at each readout cycle of said image sensor, a multispectral image composed of several elementary images which each correspond to one of the central wavelength values of the absorption peak of the terahertz radiation, and which are interlaced in the photosensitive surface.

12. The detector according to claim 1, further comprising an objective which is effective for the terahertz radiation, and which is arranged to form, on the spectral conversion element, an image of a scene external to said detector, so that the image sensor captures an image of the scene associated with the terahertz radiation, the objective being composed of metal mirrors.

13. The detector according to claim 12, further comprising a terahertz radiation illumination system, which is arranged to send terahertz radiation towards the scene.

14. The detector according to claim 4, wherein the portion of a material which has a capacity to thermally emit infrared radiation is composed of carbon nanotubes.

15. The detector of claim 4, wherein the material is a portion composed of carbon nanotubes.

16. The detector of claim 10, wherein the at least one polymer is a film based on polyimide, polyethylene terephthalate, polytetrafluoroethylene, or polypropylene.

17. The detector according to claim 2, wherein a material of the two-dimensional support is electrically insulating and has a capacity to thermally emit infrared radiation, and each infrared emitter of the spectral conversion element is composed of an area of a face of said two-dimensional support which is facing the array of microlenses, and the material of the two-dimensional support is exposed in said area.

18. The detector according to claim 2, wherein each infrared emitter of the spectral conversion element is formed by a portion of a material which has a capacity to thermally emit infrared radiation, said portion of material being located on a face of the two-dimensional support which is facing the array of microlenses, and being exposed.

19. The detector according to claim 2, wherein the spectral conversion element, the array of microlenses and the image sensor are arranged parallel to each other within a layered stack.

20. The detector according to claim 3, wherein the spectral conversion element, the array of microlenses and the image sensor are arranged parallel to each other within a layered stack.

* * * * *